United States Patent
Lee

(10) Patent No.: US 8,607,222 B2
(45) Date of Patent: Dec. 10, 2013

(54) COMMUNICATION METHOD FOR UPGRADING SOFTWARE OVER A WIRELESS NETWORK

(75) Inventor: Ki Hoon Lee, Gumi-si (KR)

(73) Assignee: LG Electronics Inc., Seoul (KR)

(*) Notice: Subject to any disclaimer, the term of this patent is extended or adjusted under 35 U.S.C. 154(b) by 231 days.

(21) Appl. No.: 13/063,549

(22) PCT Filed: Sep. 11, 2009

(86) PCT No.: PCT/KR2009/005161
§ 371 (c)(1),
(2), (4) Date: May 24, 2011

(87) PCT Pub. No.: WO2010/030138
PCT Pub. Date: Mar. 18, 2010

(65) Prior Publication Data
US 2011/0219367 A1    Sep. 8, 2011

(30) Foreign Application Priority Data
Sep. 12, 2008 (KR) .................. 10-2008-0090275

(51) Int. Cl.
*G06F 9/445* (2006.01)
(52) U.S. Cl.
USPC .................. 717/173; 717/168; 717/178
(58) Field of Classification Search
USPC .................. 717/168–178; 709/220–222
See application file for complete search history.

(56) References Cited

U.S. PATENT DOCUMENTS

| | | | |
|---|---|---|---|
| 2006/0020938 A1* | 1/2006 | Elcock et al. | 717/178 |
| 2006/0168206 A1* | 7/2006 | Choong et al. | 709/224 |
| 2007/0169080 A1* | 7/2007 | Friedman | 717/168 |
| 2008/0046878 A1* | 2/2008 | Anderson | 717/168 |
| 2009/0063631 A1* | 3/2009 | Jung et al. | 709/204 |

FOREIGN PATENT DOCUMENTS

| | | |
|---|---|---|
| CN | 1754167 A | 3/2006 |
| CN | 101192970 A | 6/2008 |
| KR | 10-2001-0100328 | 11/2001 |
| KR | 10-2001-0100328 A | 11/2001 |
| KR | 10-2006-0022756 | 3/2006 |
| KR | 10-2006-0022756 A | 3/2006 |

(Continued)

OTHER PUBLICATIONS

Li, Zhiyuan, Cheng Wang, and Rong Xu. "Task allocation for distributed multimedia processing on wirelessly networked handheld devices." Parallel and Distributed Processing Symposium., Proceedings International, IPDPS 2002, IEEE, 2002, pp. 1-6.*

(Continued)

*Primary Examiner* — Wei Zhen
*Assistant Examiner* — Satish Rampuria
(74) *Attorney, Agent, or Firm* — KED & Associates, LLP

(57) ABSTRACT

The present invention relates to a communication method for upgrading software in a wireless network. The communication method according to one aspect of the present invention relates to a communication method for upgrading software on a specific device on a wireless network, and comprises a step wherein a first message that includes information indicating versions of one or more pieces of software being used by said device is transmitted to a controller of said wireless network and a step wherein said device receives from said controller a second message that includes indication information indicating whether it is necessary to perform a software upgrade.

9 Claims, 7 Drawing Sheets

(56) References Cited

FOREIGN PATENT DOCUMENTS

| KR | 10-2006-0023401 | 3/2006 |
| KR | 10-2006-0023401 A | 3/2006 |
| KR | 10-2006-0080253 | 7/2006 |
| KR | 10-2006-0080253 A | 7/2006 |

OTHER PUBLICATIONS

Hoffmeyer, J.; Il-Pyung Park; Majmundar, M.; Blust, S.; "Radio software download for commercial wireless reconfigurable devices," Communications Magazine, IEEE, vol. 42, No. 3, 2004, pp. S26-S32.*

Staub, Thomas, et al. "Secure remote management and software distribution for wireless mesh networks." ASWN'07, Santander, Spain, May 2007, pp. 1-8.*

International Search Report issued in PCT/KR2009/005161 dated Apr. 26, 2010.

Chinese Office Action dated Mar. 28, 2013 issued in Application No. 200980144764.5 (with English translation).

* cited by examiner

→ High-rate PHY(HRP)
--→ Low-rate PHY(LRP)

LRP channel 1,2,3

HRP channel #n (n=1,2,3,4)

COMMUNICATION METHOD FOR UPGRADING SOFTWARE OVER A WIRELESS NETWORK

BACKGROUND OF THE INVENTION

1. Field of the Invention

The present invention relates to a communication method in a wireless network, and more particularly, to a communication method for upgrading software over a wireless network.

2. Discussion of the Related Art

Networks include large-scale networks providing global scale connectivity, such as wired or wireless Internet, and small-scale wired or wireless networks for connecting electric appliances in a restricted space such as a home or office. As network types continue to be diversified, interface techniques for performing communication between a network and a network or between a device and a device have also been diversified.

In recent years, a BLUETOOTH or Wireless Personal Area Network (WPAN) technique of establishing a wireless network between a relatively small number of digital devices in a restricted space such as a home or small office and exchanging audio or video data between the devices has been developed. The WPAN may be used to exchange infoimation over short distances between a relatively small number of digital devices so as to achieve low power consumption and low-cost communication between the digital devices.

FIG. 1 is a view showing an example of a Wireless Video Area Network (WVAN) which is one type of WPAN. The WVAN is a wireless network established between digital devices in a restricted space within a distance of 10 m, such as a home, which ensures throughput of 4.5 Gbps or more with a bandwidth of about 7 GHz and supports streaming of uncompressed 1080p A/V content.

Referring to FIG. 1, the WVAN is composed of two or more user devices 11 to 15 and one of the devices operates as a coordinator 11. The coordinator 11 serves to provide basic timing of the WVAN and to control Quality of Service (QoS) requirements. Examples of the devices include all digital devices such as a computer, a Personal Digital Assistant (PDA), a laptop computer, a digital television set, a camcorder, a digital camera, a printer, a microphone, a speaker, a headset, a barcode reader, a display, and a mobile phone.

The WVAN is an ad hoc network which is not designed and established in advance, but is established as necessary without the help of a central infrastructure. A process of establishing one WVAN will now be described in detail. The WVAN is started when a certain device, which may operate as a coordinator, performs the function of a coordinator. All the devices perform scanning before a new WVAN is started or before associating with the existing WVAN. Scanning refers to a process of, at a device, collecting and storing information about channels and determining whether a previously established WVAN is present. A device which receives an instruction for starting a WVAN from an upper layer establishes a new WVAN without associating with a WVAN which is previously established on a certain channel. The device selects a channel with less interference based on data acquired by the scanning process and broadcasts a beacon via the selected channel, thereby starting the WVAN. The beacon is control information which is broadcast by the coordinator in order to control and manage the WVAN, such as timing allocation information and information about the other devices within the piconet.

Almost all digital devices require software such as a microcomputer or CPU firmware in order to control the operations of the devices. In addition, the digital devices require software for implementing a communication protocol between devices, in order to associate with the WVAN so as to perform communication with other devices. Software for each device is steadily upgraded.

If software of a specific device is upgraded, a user must install the upgraded software in the device. If one user uses a large number of digital devices, it is cumbersome for a user to access a website of a manufacturer of each device and update software whenever software updates become available.

SUMMARY OF THE INVENTION

Accordingly, the present invention is directed to a communication method in a wireless network that substantially obviates one or more problems due to limitations and disadvantages of the related art.

An object of the present invention is to provide a method of efficiently upgrading software over a wireless network.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a communication method for upgrading software at a specific device of a wireless network, includes transmitting a first message including information indicating versions of one or more pieces of software being used by the device to a coordinator of the wireless network, and receiving a second message including indication information indicating whether or not the device needs to upgrade the software from the coordinator.

In another aspect of the present invention, a communication method for upgrading software of a specific device at a coordinator of a wireless network includes receiving a first message including information indicating versions of one or more pieces of software being used by the device from the device, and transmitting a second message including indication information indicating whether or not the software in the device needs to be upgraded to the device.

In another aspect of the present invention, a communication method for upgrading software at a specific device of a wireless network includes transmitting an association request message including performance information of the device and information indicating versions of one or more pieces of software being used by the device to a coordinator of the wireless network, and receiving an association response message including an indicator indicating whether or not the request for the association of the device is allowed and indication information indicating whether or not the software in the device needs to be upgraded from the coordinator.

In another aspect of the present invention, a communication method for upgrading software at a specific device of a wireless network includes transmitting a first message including information indicating versions of one or more pieces of software being used by the device to a coordinator of the wireless network, receiving channel resource allocation information for allocating channel resources for downloading the software from the coordinator, if the software in the device needs to be upgraded, and downloading the software from the coordinator or another device of the wireless network using the allocated channel resources.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
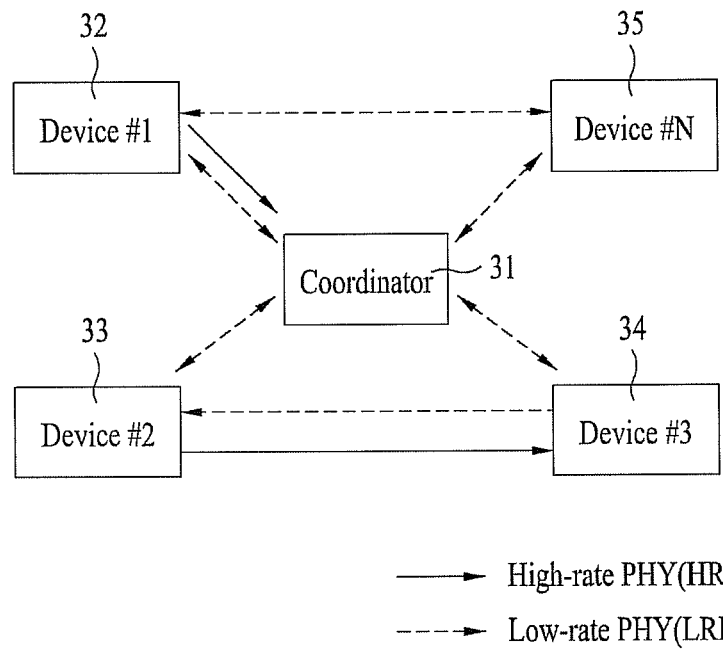
FIG. 1 is a schematic diagram showing an example of a Wireless Video Area Network (WVAN) which is one type of Wireless Personal Area Network (WPAN)
Figure 2:
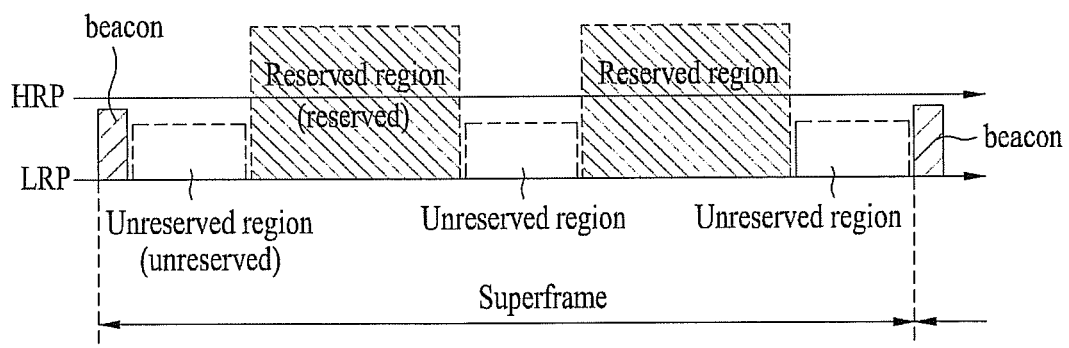
FIG. 2 is a schematic diagram showing an example of a structure of a superframe used in the WVAN.
Figure 3:
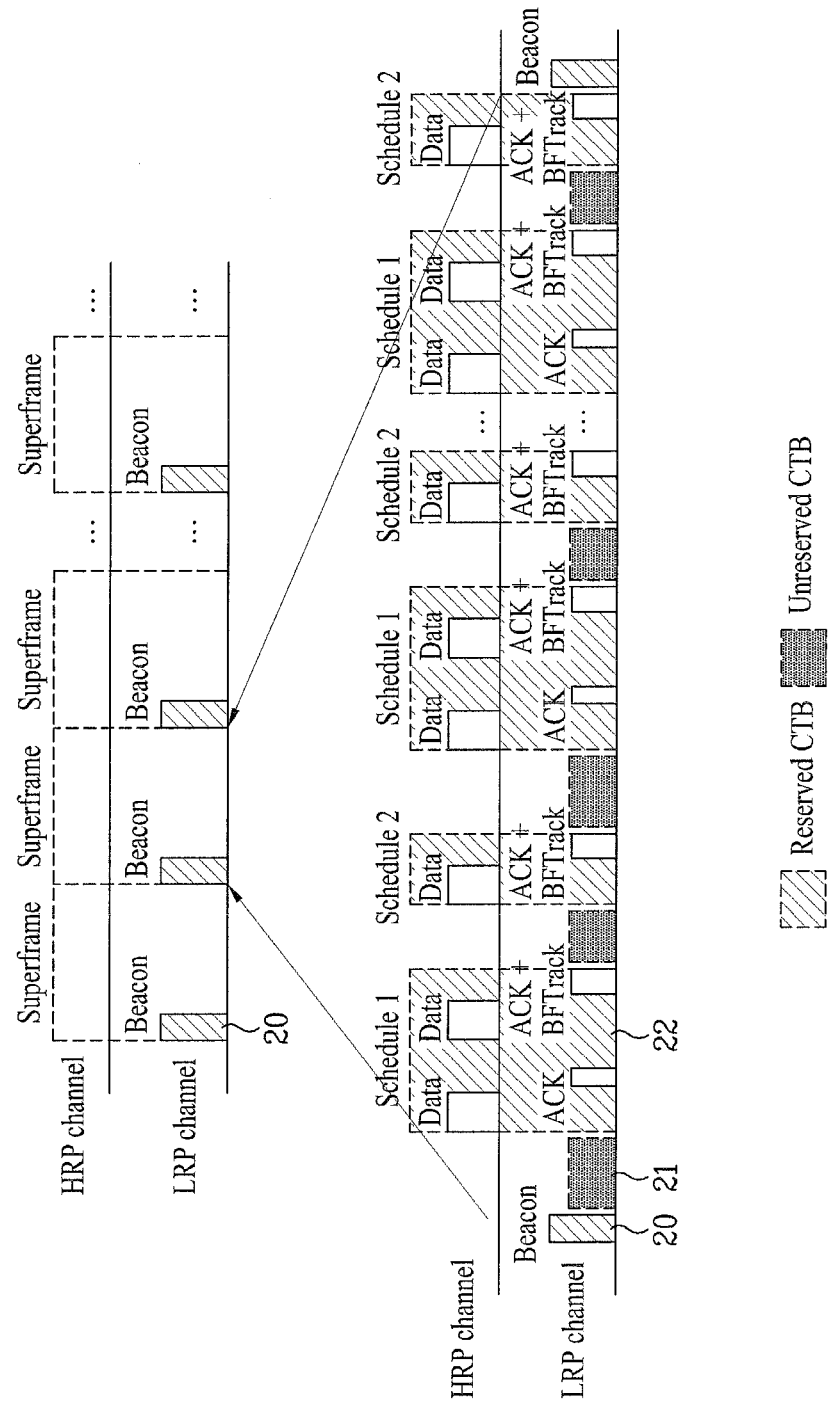
FIG. 3 is a diagram showing the structure of the superframe used in the WVAN in greater detail.

FIG. 2 shows an example of a structure of a superframe used in a WVAN. FIG. 3 is a diagram showing the structure of the superframe in greater detail.

Referring to FIGS. 2 and 3, each superframe includes a beacon region in which a beacon is transmitted, a reserved Channel Time Block (CTB) region, and an unreserved CTB region. The beacon is periodically transmitted by a coordinator in order to identify a lead-in of every superframe. The beacon includes scheduled timing information and WVAN management and control information. As described above, in the WVAN, a specific device transmits a bandwidth request command to the coordinator in order to receive channel resources for data transmission. The coordinator checks whether or not there are channel resources to be allocated to the device, and broadcasts information about channel resources allocated to the device, that is, timing allocation information, to devices within the WVAN through a subsequently transmitted beacon, if channel resources are available. Each device may exchange data over the network through timing information and management/control information included in the beacon.

The reserved CTB region is used to enable a device which receives a channel time allocated by the coordinator according to a channel time allocation request of the device to transmit data to another device. Commands, data streams and asynchronous data may be transmitted through the reserved CTB region. A High-Rate Physical (HRP) channel is used in the case where a specific device transmits data to another device through the reserved CTB region, and a Low-Rate Physical (LRP) channel is used in the case where a device which receives data transmits Acknowledgement (ACK)/Negative ACK (NACK) for the received signal.

The unreserved CTB region may be used to transmit control information, MAC commands or asynchronous data between a coordinator and a device or between devices. In order to prevent data collision between devices in the unreserved CTB region, a Carrier Sense Multiple Access (CSMA) scheme or a slotted Aloha scheme may be applied. In the unreserved CTB region, data may be transmitted via an LRP channel. If the amount of control information or commands to be transmitted is large, a reserved region may be set in the LRP channel. The lengths and the numbers of the reserved CTBs and the unreserved CTBs in each superframe may differ according to superframes and are controlled by the coordinator. Although not shown in FIG. 3, the superframe includes a contention-based control period (CBCP) located next to the beacon, in order to transmit an urgent control/management message. The length of the CBCP is set so as not to exceed a predetermined threshold mMAXCBCPLen.

The WVAN supports an HRP layer and an LRP layer as a physical layer. The HRP layer is a physical layer which can support a data transfer rate of 1 Gb/s or more and an LRP layer is a physical layer which can support a data transfer rate of several Mb/s. The HRP layer is highly directional and is used to transmit isochronous data streams, asynchronous data, Media Access Control (MAC) commands and Audio/Video (A/V) control data through unicast connection. The LRP layer supports a directional or omni-directional mode, and is used to transmit beacons, asynchronous data, and MAC commands through unicast or broadcast.

Figure 4:
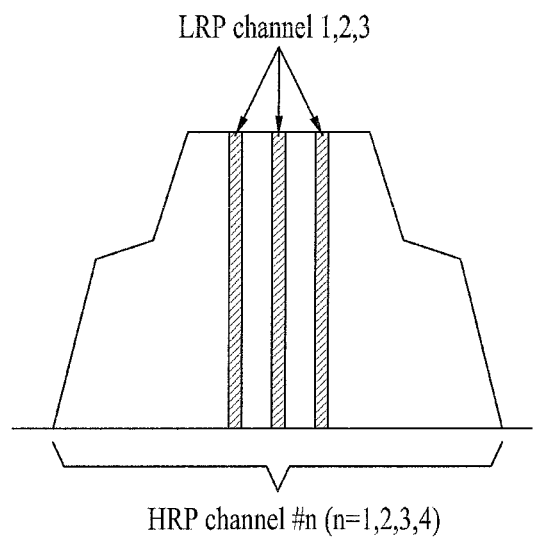
FIG. 4 is a diagram explaining a frequency band of high-rate physical (HRP) layer channels and low-rate physical (LRP) layer channels used in the WVAN.

FIG. 4 is a view explaining the frequency band of HRP channels and LRP channels used in the WVAN. The HRP layer uses four channels having a bandwidth of 2.0 GHz in a band of 57 to 66 GHz, and the LRP layer uses three channels having a bandwidth of 92 MHz. As shown in FIG. 3, the HRP channels and the LRP channels share the frequency band and the frequency band is divided and used according to a Time Division Multiple Access (TDMA) scheme.

Figure 5:
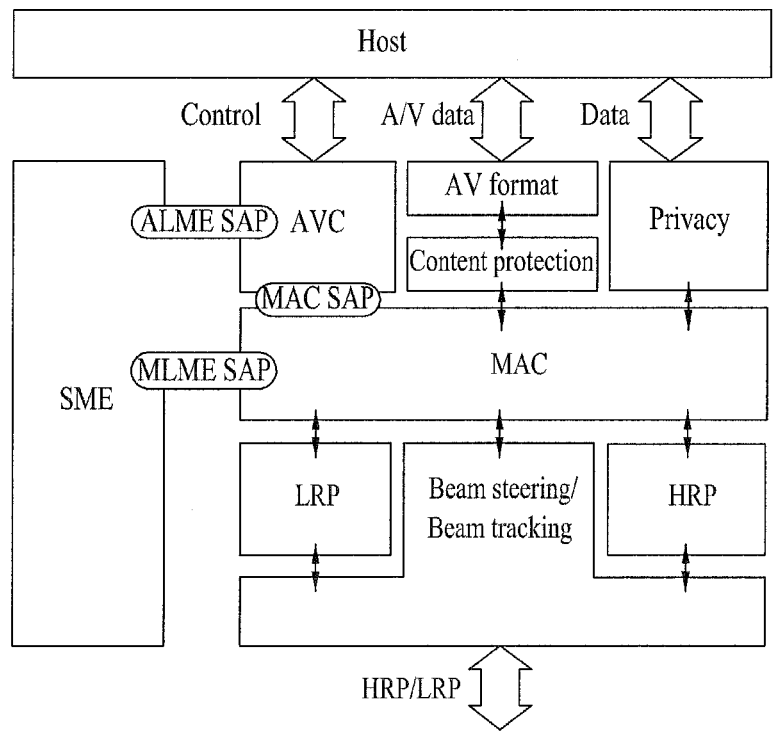
FIG. 5 is a diagram showing an example of a protocol hierarchical structure implemented in a device of the WVAN.

FIG. 5 is a diagram showing an example of a protocol hierarchical structure implemented in a device of the WVAN. Referring to FIG. 5, a communication module of each of the devices included in the WVAN may be divided into four entities: a physical (PHY) layer, a MAC sublayer, an adaptation sublayer, and a Station Management Entity (SME), according to functions. The four entities provide three services including a high-rate data service, a low-rate data service and a management service. The high-rate data service supports video, audio and data delivery. The low-rate data service supports audio data, MAC commands, and a small amount of asynchronous data. The SME is a layer-independent entity which controls low layers and collects device information from each layer.

Figure 6:
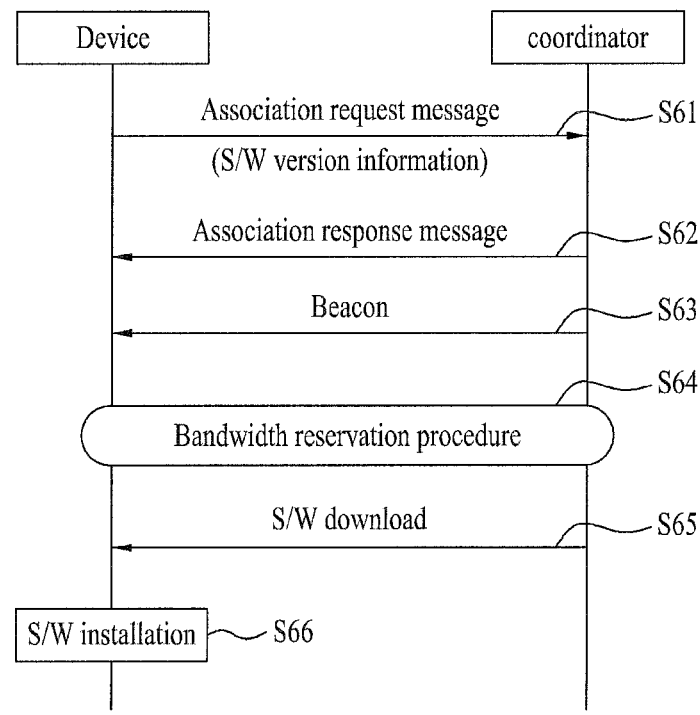
FIG. 6 is a flow diagram according to an embodiment of the present invention.

FIG. 6 is a flow diagram according to an embodiment of the present invention.

Referring to FIG. 6, a device which has yet to associate with a WVAN transmits an association request message to a coordinator in order to associate with the WVAN (S61). The association request message may be transmitted through an LRP channel. The association request message includes information about the function and performance of the device and S/W version information indicating versions (S/W versions) of one or more pieces of software installed in the device. For example, the S/W version information may be included in an association request MAC command included in the association request message. The association request MAC command refers to a command generated by the MAC sublayer of the device, in order to make a request for association.

Figure 7:
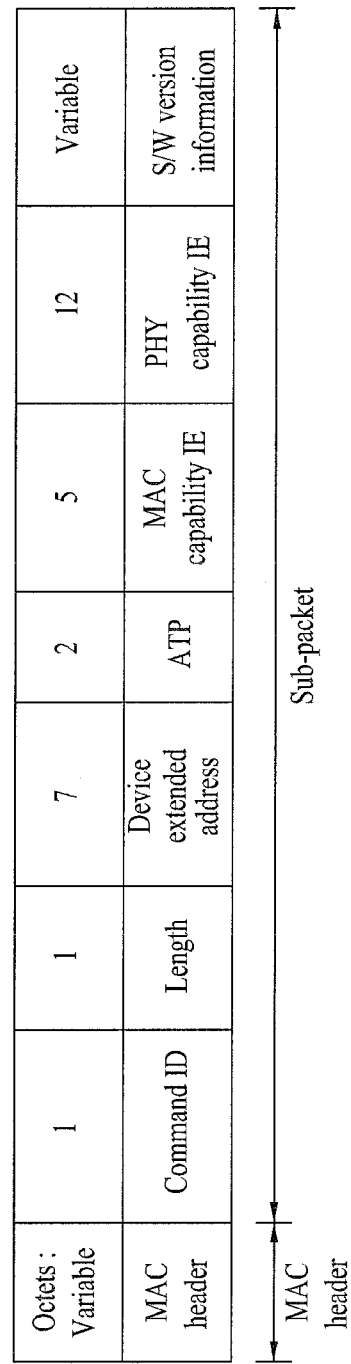
FIG. 7 is an example of a data format of an association request MAC command according to an embodiment of the present invention.

FIG. 7 is an example of a data format of an association request MAC command according to an embodiment of the present invention. As described above, the association request MAC command is generated by the MAC sublayer of the device, in order to make a request for association.

Referring to FIG. 7, the association request MAC command includes a MAC header and a sub-packet. The MAC header includes control information of the association request MAC command. The control information includes a destination ID of a device which will receive the association request MAC command, that is, a coordinator, a source ID of a device which transmits the association request MAC command, a WVAN ID, security information, and the like. In the case of the association request MAC command, a security protocol such as ciphering need not be applied.

In FIG. 7, a Command ID field includes the type of a command, that is, information indicating that the command is an association request MAC command. A length field includes length information of the association request MAC command. A Device extended address field includes extended MAC address information of a device which makes a request for association. An Association Timeout Period (ATP) field includes information about a maximum time for which an association relationship is maintained in a state in which communication between the coordinator and the device is not performed. "MAC capability IE" and "PHY capability IE" are information elements including information about the performance of the device. "MAC capability IE" includes information about MAC layer performance of the device and "PHY capability IE" includes information about physical layer performance of the device.

The information about the MAC layer performance of the device includes information about operation performance when the device is a coordinator within the WVAN, information indicating whether or not the device is a mobile device, and information indicating whether or not the device may receive an enciphered sub-packet for security purposes. The information about physical layer performance of the device includes information about HRP and LRP mode support of the device, information about the HRP channel and the LRP channel usable by the device, information about antenna support of the device, and information about beam searching.

The S/W version information field includes information indicating the versions of one or more pieces of software installed in the device. In the case where two or more pieces of software are installed in the device, the S/W version information may be configured to include two or more indicators respectively indicating the versions of the two or more pieces of software or include one indicator collectively indicating the versions of the two or more pieces of software. For example, in the case where the device is a TV receiver, the device includes software such as a microcomputer, CPU firmware and a codec. At this time, the S/W version information may separately include a first indicator indicating the version of the microcomputer, a second indicator indicating the version of the CPU firmware and a third indicator indicating the version of the codec or one indicator collectively indicating the versions of the microcomputer, the CPU firmware and the codec. Since necessary software differs according to device type, the S/W version information is preferably differently configured according to device type.

The S/W version information may further include circuit version information indicating the circuit version of the device. The circuit version information is used to prevent malfunction of the device by upgrading of software. If the circuit version of the device is different from the circuit version associated with the upgraded software stored in the coordinator, the software of the device may not be upgraded.

Although the S/W version information field is configured separately from the other fields in the embodiment of FIG. 7, the S/W version information may be included in at least one field included in the association request MAC command in another embodiment. For example, the S/W version information may include one or more reserved bits indicating "MAC capability IE" and "PHY capability IE".

Referring to FIG. 6 again, the coordinator which receives the association request message from the device transmits an association response message to the device. The association response message may be transmitted through an LRP channel. The association response message includes an association response MAC command generated by the MAC sublayer of the coordinator in response to the association request MAC command. The association response MAC command includes information indicating whether or not software in the device needs to be upgraded. That is, the coordinator compares the S/W version information received from the device with the version of software stored in the coordinator and determines whether or not the software in the device needs to be upgraded. The coordinator includes the determination result in the association response MAC command and transmits the association response MAC command to the device.

If the S/W version information includes circuit version information indicating the circuit version of the device and the circuit version of the device is different from the circuit version associated with the upgraded software stored in the coordinator, the coordinator determines that the software of the device is not upgraded.

If the coordinator does not include the latest version of software used in the device, the coordinator may receive the latest version of software from another device within the WVAN. In this case, the coordinator transmits the S/W version information received from the device to the other devices within the WVAN. The other devices may compare the S/W version information received from the coordinator with the versions of the software stored in the other devices and directly transmit the software to the coordinator or the device which makes a request for association if it is determined that software needs to be upgraded.

Figure 8:
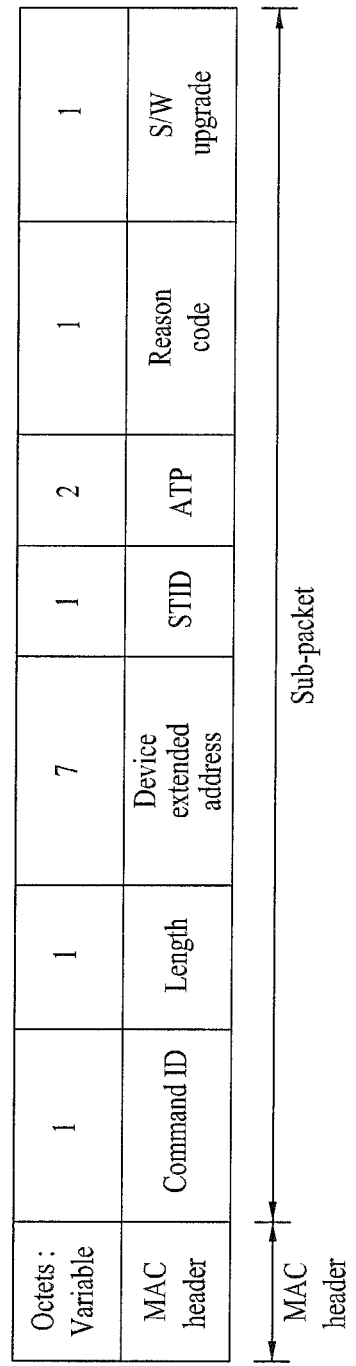
FIG. 8 is a diagram showing an example of a data format of an association response MAC command according to an embodiment of the present invention.

FIG. 8 is a diagram showing an example of a data format of an association response MAC command according to an embodiment of the present invention. In FIG. 8, the association response MAC command also includes a MAC header and a sub-packet. A Station extended address field includes an extended MAC address of the device. An STID field includes identifier information allocated to the device if association is successful. An ATP field includes information about a maximum time for which association is maintained in a state in which communication between the coordinator and the device is not performed. A Reason code field includes information about the reason why the association of the device succeeds or fails. An S/W upgrade field includes information indicating whether or not the software in the device needs to be upgraded. The S/W upgrade field may further include information about the amount of data to be downloaded for upgrading software. The S/W upgrade field may be included in at least one field included in the association response MAC command without being configured as a separate field.

Hereinafter, a description will be made on the assumption that information indicating that the association of the device succeeds is included in the reason code field of the association response MAC command and information indicating that the device needs to upgrade software is included in the S/W upgrade field.

The device receives a beacon broadcast from the coordinator after associating with the WVAN (S63). The beacon includes control information necessary to control and manage the WVAN such as timing allocation information of a superframe used in the WVAN and information about other devices. Each superframe is started at the beacon transmitted by the coordinator and the start of the superframe and subsequent timing information are measured from a first symbol of a PHY preamble of the beacon.

The device performs a bandwidth reservation procedure with the coordinator in order to secure channel resources for downloading software from the coordinator or another device (S65). The bandwidth reservation procedure is performed by, at the device, transmitting a bandwidth request message to the coordinator and receiving a bandwidth response message from the coordinator. The bandwidth request message includes information about the number of requested minimum and maximum time blocks, a time block duration of each time block within a schedule and a minimum and maximum schedule period. The bandwidth response message includes information indicating whether or not channel resources requested by the device are allocated and the reason why the requested channel resources cannot be allocated. Channel resources (CTB) for downloading the software may be located at an HRP channel or an LRP channel.

The device downloads software from the coordinator or another device using the channel resources allocated in the bandwidth reservation procedure (S65). If the device includes a display as in a TV receiver, a PC, a laptop computer, a mobile communication terminal, etc., the download progress may be displayed on the display screen. If the device does not include a display screen, the download progress may be displayed using a device including a display screen within the WVAN.

Figure 9:
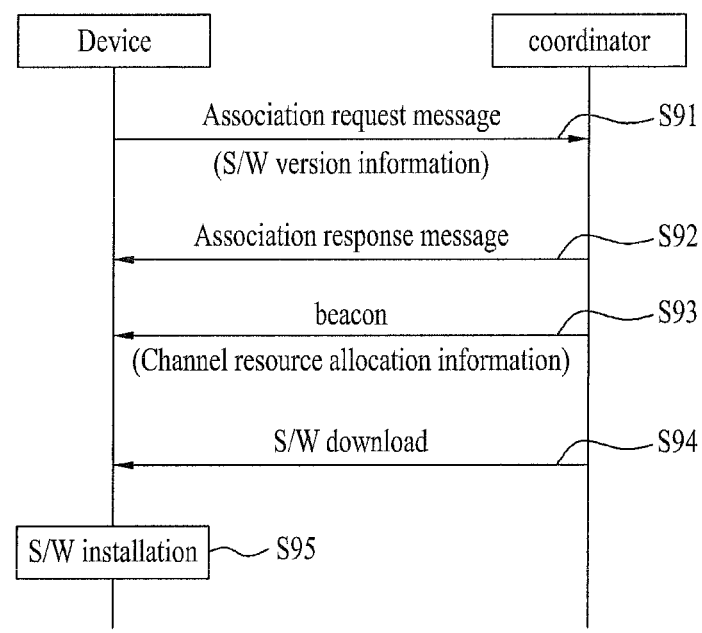
FIG. 9 is a flow diagram according to another embodiment of the present invention.

The device installs the downloaded software (S66) and performs communication with other devices within the WVAN, FIG. 9 is a flow diagram according to another embodiment of the present invention.

Referring to FIG. 9, a device which wishes to associate with the WVAN transmits an association request message including S/W version information to a coordinator (S91). For a description of the process (S92) of receiving an association response message reference may be made to the description of steps S61 and S62 of FIG. 6. If the coordinator determines that the software in the device needs to be upgraded, the coordinator broadcasts a beacon including information for allocating channel resources (CTB) for downloading the software to the device (S94). In this case, the device downloads the software from the coordinator using the channel resources allocated from the coordinator without a bandwidth reservation procedure (S94). The device installs the downloaded software (S95) and performs communication with other devices as necessary.

Although examples in which the device includes the S/W version information in the association request message and transmits the association request message to the coordinator are described in the above-described embodiments, the present invention is not limited thereto. That is, the device may include the S/W version information in a certain message transmitted to the coordinator and transmit the message, after associating with the WVAN. In this case, the coordinator includes information indicating whether or not the device needs to download software in a response message to the certain message and transmits the response message to the device. Subsequent processes may be performed as described in the embodiments of FIGS. 6 and 9.

The above-described terms may be replaced with other terms. For example, the term "device" may be replaced with the term "user equipment (or device)", "station", etc., and the term "coordinator" may be replaced with the term "coordination (or control) apparatus", "coordination (or control) device", "coordination (or control) station", "coordinator", or "Piconet Coordinator (PNC)".

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments according to the present invention can be implemented by various means, for example, hardware, firmware, software, or a combination thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described above. Software code may be stored in a memory unit and then may be driven by a processor. The memory unit may be located inside or outside the processor to transmit and receive data to and from the processor through various means which are well known.

The present invention is applicable to a wireless network such as a WPAN or a WVAN.

According to the present invention, it is possible to easily check whether or not software of a specific device needs to be upgraded and efficiently upgrade the software over a wireless network if the software needs to be upgraded.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A communication method for upgrading software at a first device of a wireless video area network (WVAN), the communication method comprising:
   transmitting an association request message to a coordinator to request an association of the first device with the WVAN, the association request message including information indicating versions of one or more pieces of software used by the first device, wherein the first device receives a beacon broadcast from the coordinator after associating with the WVAN, wherein the beacon includes scheduled timing information, WVAN management and control information, and wherein the association request message is a Media Access Control (MAC) command, the association request MAC command includes a MAC header and a sub-packet, and the MAC header includes the control information of the association request MAC command;
   receiving channel resource allocation information from the coordinator when the coordinator determines that the software needs to be upgraded based on the information included in the association request message, the channel resource allocation information for allocating channel resources for the first device to download the software from the coordinator or a second device of the WVAN; and
   downloading the software from the coordinator or the second device using the allocated channel resources.

2. The communication method according to claim 1, wherein the association request message further includes information regarding performance of the first device.

3. The communication method according to claim 2, wherein the information regarding the performance of the first device includes Media Access Control (MAC) layer performance information and physical (PHY) performance information of the first device.

4. A communication method for upgrading software of a first device at a coordinator of a wireless video area network (WVAN), the communication method comprising:
   receiving an association request message from the first device to request an association of the first device with the WVAN, the association request message including information indicating versions of one or more pieces of software used by the first device, wherein the coordinator provides a beacon broadcast to the first device after associating with the WVAN, wherein the beacon includes scheduled timing information, WVAN management and control information, and wherein the association request message is a Media Access Control (MAC) command, the association request MAC command includes a MAC header and a sub-packet, and the MAC header includes the control information of the association request MAC command; and
   transmitting channel resource allocation information to the first device when the coordinator determines that the software needs to be upgraded based on the information included in the association request message, the channel resource allocation information for allocating channel resources for the first device to download the software from the coordinator or a second device of the WVAN.

5. The communication method according to claim 4, wherein the association request message further includes information regarding performance of the first device.

6. The communication method according to claim 5, wherein the information regarding the performance of the device includes Media Access Control (MAC) layer performance information and physical (PHY) performance information of the first device.

7. A device for use in a wireless video area network (WVAN), the device configured to:
   transmit an association request message to a coordinator to request an association of the device with the WVAN, the association request message including information indicating versions of one or more pieces of software used by the device, wherein the device receives a beacon broadcast from the coordinator after associating with the WVAN, wherein the beacon includes scheduled timing information, WVAN management and control information, and wherein the association request message is a Media Access Control (MAC) command, the association request MAC command includes a MAC header and a sub-packet, and the MAC header includes the control information of the association request MAC command;
   receive channel resource allocation information from the coordinator when the coordinator determines that the software needs to be upgraded, the channel resource allocation information for allocating channel resources for the device to download the software from the coordinator or another device of the WVAN; and
   download the software from the coordinator or the another device using the allocated channel resources.

8. The device according to claim 7, wherein the association request message further includes information regarding performance of the device.

9. The device according to claim 8, wherein the information regarding the performance of the device includes Media Access Control (MAC) layer performance information and physical (PHY) performance information of the device.

* * * * *